United States Patent
Lin et al.

(10) Patent No.: US 10,341,669 B2
(45) Date of Patent: Jul. 2, 2019

(54) TEMPORALLY ENCODING A STATIC SPATIAL IMAGE

(71) Applicant: Intel Corporation, Santa Clara, CA (US)

(72) Inventors: Chit Kwan Lin, New York, NY (US); Gautham N Chinya, Hillsboro, OR (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 15/385,125

(22) Filed: Dec. 20, 2016

(65) Prior Publication Data

US 2018/0176583 A1 Jun. 21, 2018

(51) Int. Cl.
*H04N 19/182* (2014.01)
*G06N 3/04* (2006.01)
*G06K 9/62* (2006.01)
*H04N 19/129* (2014.01)

(52) U.S. Cl.
CPC ......... *H04N 19/182* (2014.11); *G06K 9/6259* (2013.01); *G06N 3/04* (2013.01); *G06N 3/049* (2013.01); *H04N 19/129* (2014.11); *G06T 2207/20084* (2013.01)

(58) Field of Classification Search
None
See application file for complete search history.

(56) References Cited

U.S. PATENT DOCUMENTS

| | | | | |
|---|---|---|---|---|
| 9,111,182 | B1* | 8/2015 | Chelian | G06K 9/4628 |
| 9,443,189 | B1* | 9/2016 | Chelian | G06N 3/02 |
| 2009/0287624 | A1* | 11/2009 | Rouat | G06K 9/4623 |
| | | | | 706/20 |
| 2010/0257130 | A1* | 10/2010 | Smallridge | G06N 3/02 |
| | | | | 706/25 |
| 2014/0016858 | A1* | 1/2014 | Richert | G06K 9/62 |
| | | | | 382/156 |
| 2014/0046885 | A1* | 2/2014 | Majumdar | G06N 3/02 |
| | | | | 706/22 |

(Continued)

FOREIGN PATENT DOCUMENTS

WO 2013106074 7/2013

OTHER PUBLICATIONS

Srinivasa, Narayan, and Youngkwan Cho. "Unsupervised discrimination of patterns in spiking neural networks with excitatory and inhibitory synaptic plasticity." Frontiers in computational neuroscience 8 (2014): 159. 23 pages (Year: 2014).*

(Continued)

*Primary Examiner* — Ryan P Potts
(74) *Attorney, Agent, or Firm* — Schwegman Lundberg & Woessner, P.A.

(57) ABSTRACT

System and techniques for temporally encoded static spatial images are described herein. A static spatial image may be obtained. Here, the static spatial image defines pixel values over an area. A scan path may be selected. Here, the scan path defines a path across the area of the static spatial image. A window is scanned (e.g., moved or slid) along the scan path on the static spatial image to produce changes in a portion of the window over time. The changes in the portion of the window are recorded along with respective times of the changes.

24 Claims, 11 Drawing Sheets

(56) References Cited

U.S. PATENT DOCUMENTS

| | | | |
|---|---|---|---|
| 2014/0064609 A1* | 3/2014 | Petre | G06K 9/6232 |
| | | | 382/159 |
| 2014/0258194 A1* | 9/2014 | Towal | G06N 3/02 |
| | | | 706/15 |
| 2015/0310303 A1* | 10/2015 | Andreopoulos | G06K 9/4676 |
| | | | 382/158 |

OTHER PUBLICATIONS

Srinivasa, Narayan, and Qin Jiang. "Stable learning of functional maps in self-organizing spiking neural networks with continuous synaptic plasticity." Frontiers in computational neuroscience 7 (2013): 10. 24 pages (Year: 2013).*

"European Application Serial No. 17208276.0, Extended European Search Report dated May 23, 2018", 11 pgs.

Amirhossein, Tavanaei, "A Minimal Spiking Neural Network to Rapidly Train and Classify Handwritten Digits in Binary and 10-Digit Tasks", International Journal of Advanced Research in Artificial Intelligence, vol. 4, No. 7, (2015), 8 pgs.

Daqi, Liu, "Visual pattern recognition using unsupervised spike timing dependent plasticity learning", International Joint Conference on Neural Networks (IJCNN), IEEE, (Jul. 24, 2016), 285-292.

Matthias, Oster, "A Spike-Based Saccadic Recognition System", Circuits and Systems, ISCAS IEEE International Symposium on, IEEE, (2007), 3083-3086.

Yu, Qiang, "Rapid Feedforward Computation by Temporal Encoding and Learning With Spiking Neurons", IEEE Transactions on Neural Networks and Learning Systems, IEEE, Piscataway, NJ, USA vol. 24, No. 10, (Oct. 2013), 1539-1552.

\* cited by examiner

TEMPORALLY ENCODING A STATIC SPATIAL IMAGE

TECHNICAL FIELD

Embodiments described herein generally relate to image encoding and more specifically to temporally encoding static spatial images.

BACKGROUND

Artificial intelligence is a field concerned with developing artificial systems to perform cognitive tasks that have traditionally required a living actor, such as a person. Artificial neural networks (ANNs) have proven to be a useful tool in achieving tasks that have heretofore been accomplished by people. There are many different ANN designs, including spiking neural networks (SNN). An SNN differs from other ANNs in its use of time of activation (e.g., when a spike arrives) at a neuron as well as connectivity of the activation (e.g., from what neuron was the spike sent and to which synapse was the spike received).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
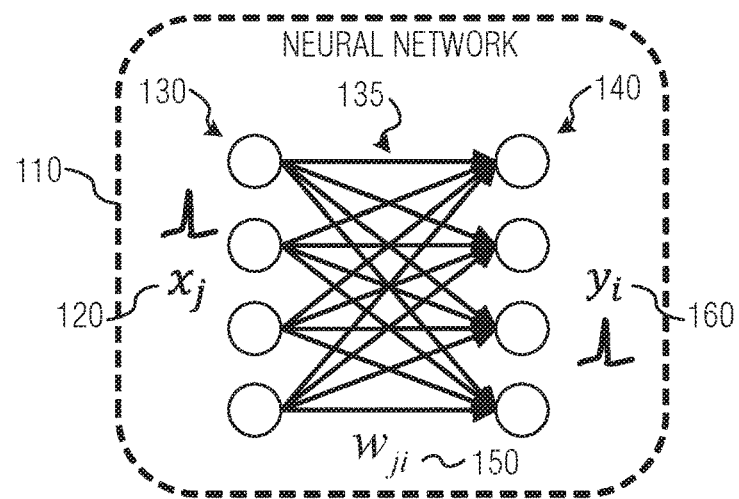
FIG. 1 is a diagram of an example of a neural network, according to an embodiment.

SNNs provide a more realistic model of biological neural networks by incorporating the timing of spikes as well as the connections between neurons. The additional complexity of accounting for spike timing may be avoided on traditional platforms (e.g., von Neumann architectures), but may be easier to use on new computing models, such as neuromorphic cores, chips, or chip clusters. The techniques described below, however, will operate without regard to any particular computing architecture.

SNN architecture permits a relatively powerful implementation of Hebbian learning in STDP. STDP essentially enforces connections to a neuron that provided spikes that preceded that neuron's own spike and dampens connections to the neuron that provided spikes that follow the neuron's own spike. Additional details of the operation of STDP in an SNN are provided below with respect to FIGS. 1-6D. The operation of STDP in SNNs provides an unsupervised training of the SNN to recognize simple (e.g., non-multipart) patterns.

Because SNNs operate on a temporal spiking model, input to the SNN is timed spikes. This allows relatively straightforward application to pattern recognition of, for example, audio data, or in imaging devices such as a Dynamic Vision Sensor (DVS) camera, which is not frame based, but rather sends a message for each pixel when that pixel changes (e.g., either greater or lesser luminance) from a previous condition. There is not, however, a straightforward application to static spatial images, which are unchanging images defining pixels over an area as would typically be the case of raster images or encodings that produce raster images such as JPEG, PNG, or GIF encodings.

To address the problem of using static spatial images in SNNs, the static spatial image may be temporally encoded. The temporal encoding described herein selects a scan path with which to scan across the static spatial image. The scan uses a window, which may be as narrow as a single pixel, and a timing. As the window moves (e.g., scans, slides, etc.) along the scan path, the portions of the window (e.g., a pixel in the center of the window) change as it corresponds to different pixels of the static spatial image. These changes are recorded when they occur, resulting in the temporally encoded static spatial image. This temporally encoded static spatial image may then be fed into an SNN for pattern detection. Additional details and examples are provided below.

Another issue that arises in STDP is the natural convergence of output neurons to a pattern presented in input data. Although the connectivity (e.g., synapse weights) between input, hidden, or output neurons may be randomly initialized, the presence of a reoccurring pattern will tend to cause multiple output neurons to converge on the pattern, producing confirmatory spikes that coincide. Thus, generally, a single output neuron operates as an equivalent to multiple output neurons to detect a simple pattern.

To address multi-part pattern detection, the SNN is modified such that output neurons include recurrent inhibitory connections to each other. The inhibition may be triggered when a given output neuron spikes (e.g., indicates a pattern) and works to prevent, or simply make it harder for, the recipient output neuron to spike. Because STDP uses spiking in a neuron to determine how connections are strengthened or weakened, prevent, or interfering with, a spike will cause the recipient neuron to converge on a different pattern in the input data. Thus, multi-part patterns (such as complex gestures) or simply multiple different patterns, may be detected in this way. Additional details and examples are provided below.

FIG. 1 is a diagram of an example of a neural network 110, according to an embodiment. The neural network 110 includes connections 135 between a first set of nodes 130 (e.g., input neurons) and a second set of nodes 140 (e.g., output neurons). Neural networks (such as the neural network 110) are commonly organized into multiple layers, including input layers and output layers. Thus, the neural network 110 may be modeled as a graph in which nodes of the graph represent neurons and connections in the graph represent connections between those neurons. Here, the neural network 110 only depicts two layers and a small numbers of nodes but other forms of neural networks may include a large number of nodes, layers, connections, and pathways.

Figure 12:
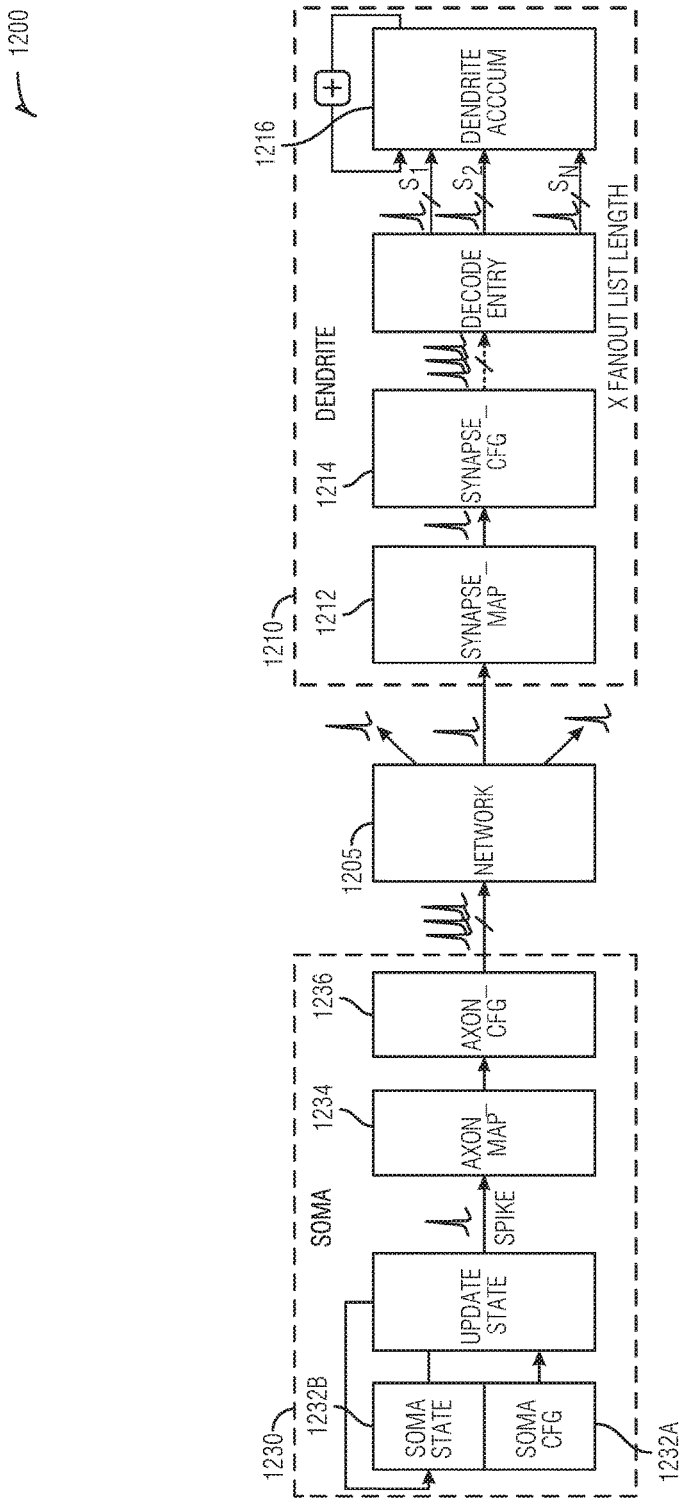
FIG. 12 illustrates an example of a neuromorphic core upon which one or more embodiments may be implemented.

Data that is provided into the neutral network is first processed by synapses of input neurons. Interactions between the inputs, the neuron's synapses and the neuron itself govern whether an output is provided via an axon to another neuron's synapse. Modeling the synapses, neurons, axons, etc., may be accomplished in a variety of ways. In an example, neuromorphic hardware includes individual processing elements in a synthetic neuron (e.g., neurocore) and a messaging fabricate to communicate outputs to other neurons. An example is illustrated in FIG. 12. Neuromorphic hardware thus includes electronic elements that more closely model the biological neuron to implement the neural network. The techniques described herein will operate on a variety of neuromorphic hardware implementations, as well as software modeled networks such as may be executed an a van Neumann architecture or other computing architecture.

The determination of whether a particular neuron "fires" to provide data to a further connected neuron is dependent on the activation function applied by the neuron and the weight of the synaptic connection (e.g., $w_{ji}$ 150) from neuron j (e.g., located in a layer of the first set of nodes 130) to neuron i (e.g., located in a layer of the second set of nodes 140). The input received by neuron j is depicted as value $x_j$ 120, and the output produced from neuron i is depicted as value $y_i$ 160. Thus, the processing conducted in the neural network 110 is based on weighted connections, thresholds, and evaluations performed among the neurons, synapses, and other elements of the neural network.

In an example, the neural network 110 is implemented in a network of spiking neural network cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

FIG. 1 further shows the receipt of a spike, represented in the value $x_j$ 120, at neuron j in a first set of neurons (e.g., a neuron of the first set of nodes 130). The output of the neural network 110 is also shown as a spike, represented by the value $y_i$ 160, which arrives at neuron i in a second set of neurons (e.g., a neuron of the second set of nodes 140) via a path established by the connections 135. As noted above, in an SNN, communication occurs over event-driven action potentials, or spikes. In an example, the spikes convey no information other than the spike time as well as a source and destination neuron, or synapse, pair. Computation occurs in each neuron as a result of the dynamic, nonlinear integration of weighted spike input using real-valued state variables. The temporal sequence of spikes generated by or for a particular neuron may be referred to as its "spike train."

Figure 2:
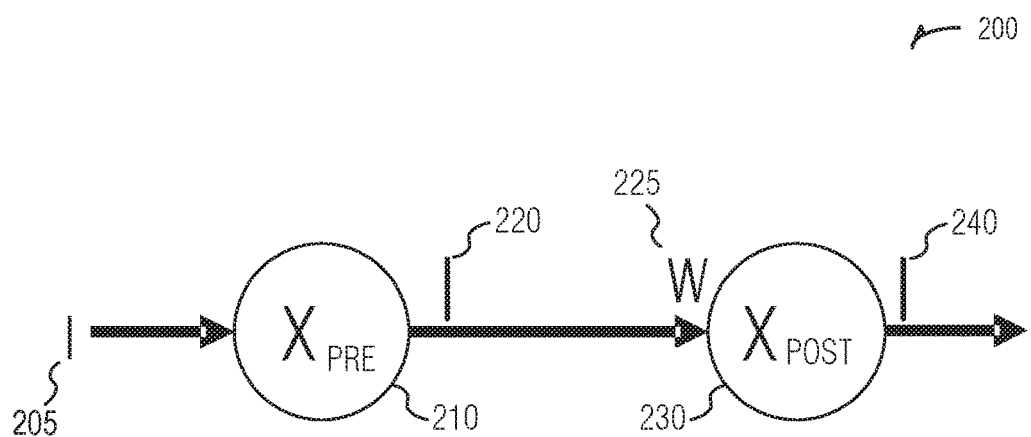
FIG. 2 illustrates spiking in a neural network pathway to implement spike timing dependent plasticity (STDP), according to an embodiment.

FIG. 2 illustrates spiking in a neural network pathway 200 to implement STDP, according to an embodiment. As shown, the pathway 200 includes one or more inputs 205 (e.g., a spike or spike train) being provided to a neuron $X_{PRE}$ 210 for processing. The neuron $X_{PRE}$ 210 causes a first spike 220, which is propagated to a neuron $X_{POST}$ 230 for processing. The connection between the neuron $X_{PRE}$ 210 and the neuron $X_{POST}$ 230 (e.g., a synaptic connection) is weighted based on a weight W 225. If inputs received at neuron $X_{POST}$ 230 (e.g., received from one or multiple connections) reach a particular threshold, the neuron $X_{POST}$ 230 will activate (e.g., "fire"), causing a second spike 240 to be sent (e.g., to other, downstream neurons). The determination that the second spike 240 is caused as a result of the first spike 220 is used to strengthen the connection between the neuron $X_{PRE}$ 210 and the neuron $X_{POST}$ 230 (e.g., by modifying the weight W 225) based on principles of STDP.

Specifically. STDP is used to adjust the strength of the connections (e.g., synapses) between neurons in a neural network by correlating the timing between an input spike (e.g., the first spike 220) and an output spike (e.g., the second spike 240). Input spikes that closely (e.g., as defined by a configuration parameter such as ten milliseconds or a function) precede an output spike for a neuron are considered causal to the output and are strengthened, while other input spikes may be weakened. For example, the adjusted weight produced from STDP in this example may be represented by the following (replicated in FIG. 2):

$$\dot{W} = A^+\overline{X_{pre}}X_{post} - A^-X_{pre}\overline{X_{post}}$$

where $A^+\overline{X_{pre}}X_{post}$ represents long term potentiation (LTP) and $A^-X_{pre}\overline{X_{post}}$ represents long term depression (LTD) of a particular synapse weight.

The illustrated neural network pathway 200, when combined with other neurons operating on the same principles, exhibit a natural unsupervised learning as repeated patterns in the inputs 205 will have their pathways strengthened over time. Conversely, noise, which may produce the spike 220 on occasion, will not be regular enough to have associated pathways strengthened. Generally, the original weightings of any connections is random.

Figure 3:
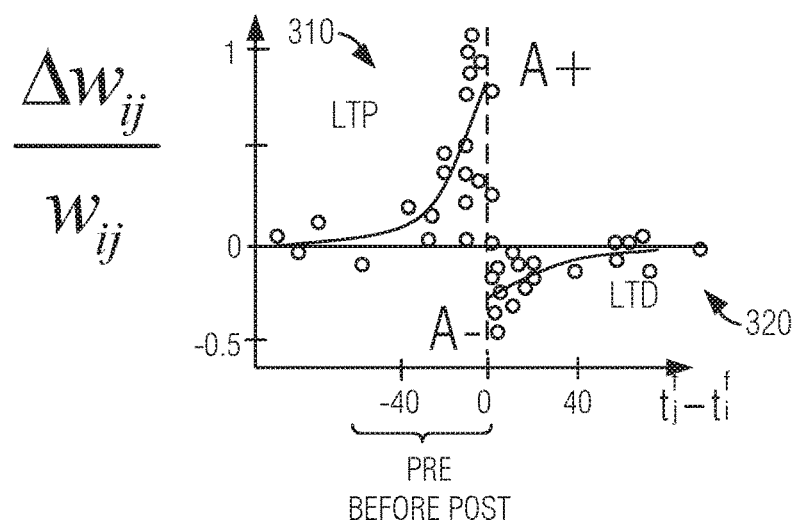
FIG. 3 illustrates an example of STDP that results in synapse weighting, according to an embodiment.

FIG. 3 illustrates an example STDP results in synapse weighting, according to an embodiment. The y axis indicates a synaptic weight and the x axis indicates time. The vertical dashed line indicates a time in which a post spike (e.g., a spike produced by the neuron to which the synapse belongs) occurred. As shown, the effect of changes of a synaptic weight ($\Delta w_{ij}$) are determined relative to the synaptic weight ($w_{ij}$). Thus, the weights to the left of the vertical line evidence long term potentiation (LTP) 310 and those to the right evidence long term depression (LTD) 320.

Evident in the plot of FIG. 3 is the relationship between a time of an input, or pre spike, and the time of the post spike. Although an inverse exponential relationship is here illustrated, generally, the closer the pre spike is to the post spike, the greater the synapse is strengthened. Similarly, the closer a spike following the post spike is, the greater the weakening effect to the responsible synapse's weight.

Figure 4:
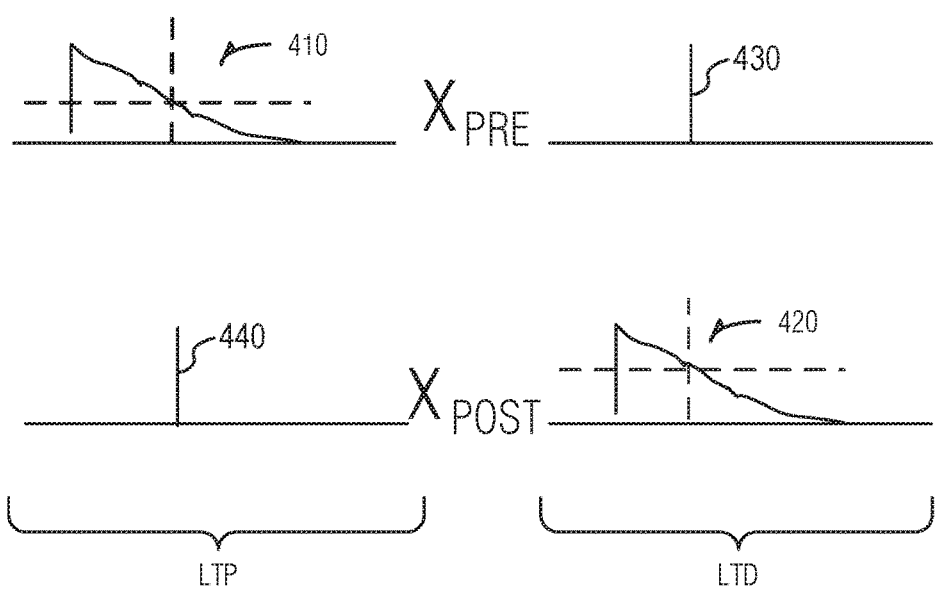
FIG. 4 illustrates an example of values from unsupervised STDP learning, according to an embodiment.

FIG. 4 illustrates an example of values from unsupervised STDP learning, according to an embodiment. To continue the discussion of FIG. 3, FIG. 4 illustrates a specific selection of weight adjustments based on timing of pre spikes and post spikes. Specifically, for LTP, a pre spike trace 410 defines a decay for the pre spike once it is received. When post spike 440 occurs, the time of the post spike is used to calculate the weight adjustment of the pre spike synapse via the pre spike decay, here illustrated with the cross-hairs. Thus, in this example, the synapse's weight will be modified by the value indicated at the cross hairs.

In a similar manner, for LTD, when the post spike occurs, a post spike decay 420 defines weight depression as a function of time for a pre spike 430 following the post spike 440. Again, the weight for the synapse responsible for the pre spike 430 is adjusted by the value under the crosshairs defined by the post spike decay. In this case, however, the synapse is weakened.

Figure 5:
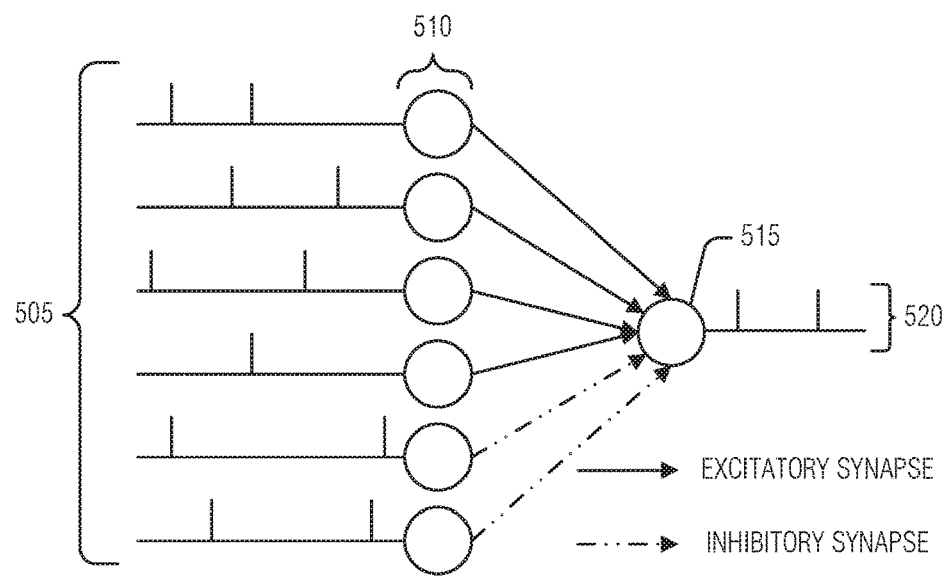
FIG. 5 illustrates an example of SNN learning a pattern via STDP, according to an embodiment.

FIG. 5 illustrates an example of SNN learning a pattern via STDP, according to an embodiment. The SNN of FIG. 5 includes a number of spike trains 505 feeding into a plurality of input neurons 510. The input neurons 510 are then connected with an output neuron 515 that produces the spike train 520. The inhibitory synapses provide spikes that inhibit the spiking of the output neuron 515.

As noted above, when a network such as that illustrated implements STDP, the network will converge on a pattern. This works because the reoccurrence of the pattern will provide a consistent group of participant synapses in the spiking of the output neuron 515. Experiments have also shown that the pattern is recognized with a very minimal introduction, the spike train 520 providing spikes within a very short time of pattern presentation when the network is used for inference (e.g., pattern detection) purposes. Such a network, provided with 2000 input neurons 510 and one output neuron 515, was presented with a pattern embedded in 1000 inputs (e.g., to specific input neurons 510) with duration of 50 milliseconds at random times and with jitter. The remaining input neurons 510 received Poisson noise. The total presentation was for 450 seconds.

After approximately 70 presentations (or about 13 seconds) the output neuron 515 stopped discharging outside the pattern (e.g., no false alarms in the spike train 520) while only discharging within pattern presence (e.g., having a high hit rate). After convergence, the output neuron 515 only discharged once for any given presentation of the pattern at beginning to the pattern presentation, providing a very low latency to the pattern detection. This experiment demonstrated that STDP helps detect a repeating pattern embedded within dense distractor spike trains (e.g., noise), providing coincidence detection that is robust to jitter, to missing spikes, and to noise.

FIGS. 6A-6D illustrates an example of synapse weight progression during SNN learning via STDP, according to an embodiment. These figures walk through a use case of the STDP learning discussed above.

Figure 6A:
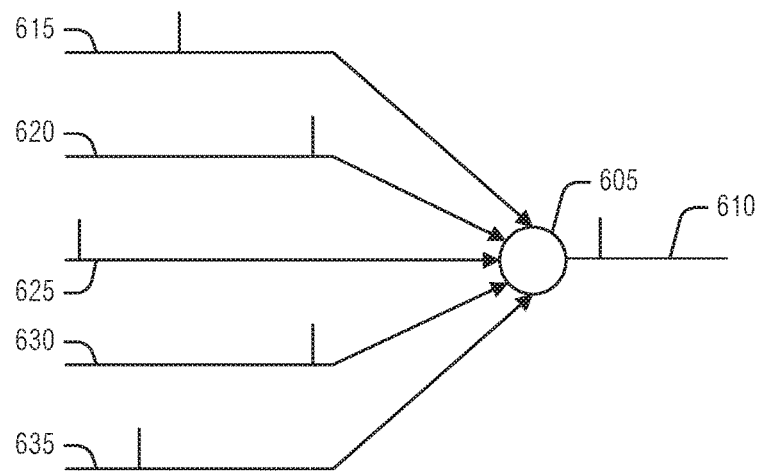
FIGS. 6A-6D illustrates an example of synapse weight progression during SNN learning via STDP, according to an embodiment.

FIG. 6A illustrates an initial state where synapses (the arrows emanating from spike trains 615-635) are initially weak (the strength of the synapses is represented by their respective thicknesses). Each of spike trains 615-635 have a single spike and the neuron 605 includes a single spike in its spike train 610. Here, for the purposes of the example, it is assumed that the neuron 605 requires two strong spikes to generate the post synaptic spike in its spike train 610.

Figure 6B:
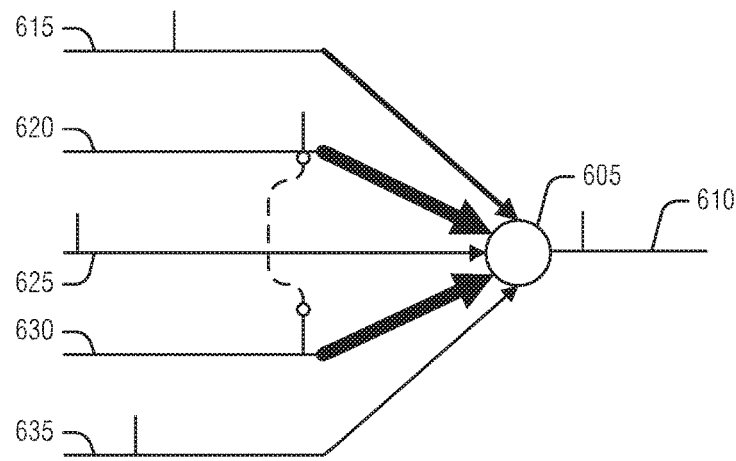

FIG. 6B illustrates that, after some repeated presentation of the pattern (as well as any accompanying noise), STDP causes the synapse receiving spike train 615 to be somewhat strengthened and the synapses corresponding to spike trains 620 and 630 to become greatly strengthened (indicated by the dashed connector between spikes). During this phase, STDP has quickly identified these synapses as large contributors to the post synaptic spike of the neuron 605. However, these are initial impressions of STDP when presented with the pattern.

Figure 6C:
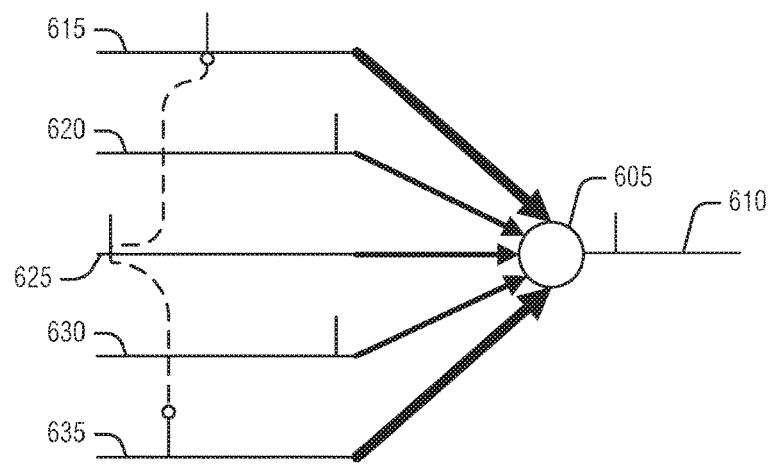

FIG. 6C illustrates that, after additional presentations, the collection of spike trains contributing to the post synaptic spike has changed. Specifically, the strength of the synapses from FIG. 6B are weakened (due to inconsistent presence during post synaptic spiking) and synapses corresponding to spike trains 615, 625, and 635 are strengthened (illustrated by the dashed connector between spikes).

Figure 6D:
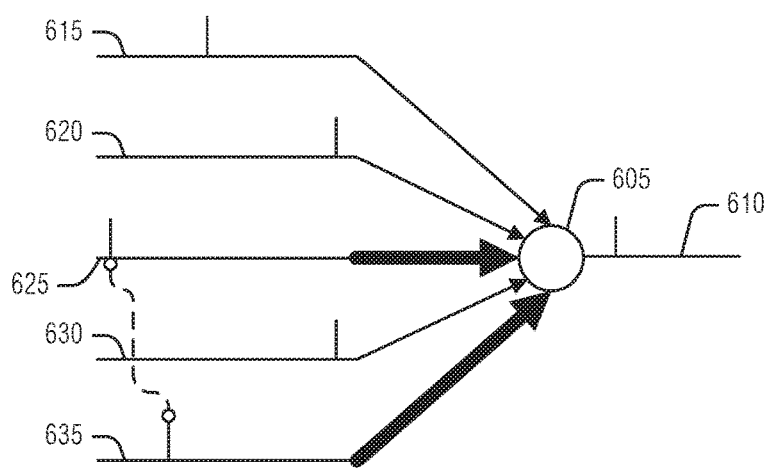

FIG. 6D illustrates a final weighting of synapses after the training presentations are concluded. Here, the network converged to give the greatest strength to the synapses corresponding to spike trains 625 and 635 (illustrated by the dashed connector between spikes) while weakening the previously strong synapses. This progression may occur because the earlier synapses, while part of the pattern, may have presented later in time in the pattern while the synapses chosen at the end to be the strongest represent the earliest consistent action evidencing the pattern. While this behavior of STDP systems leads to low latency in ascertaining the presence of a pattern, it may have some difficulty in multi-part patterns, where multi patterns, or multiple patterns with similar beginning sequences, are present.

Figure 7:
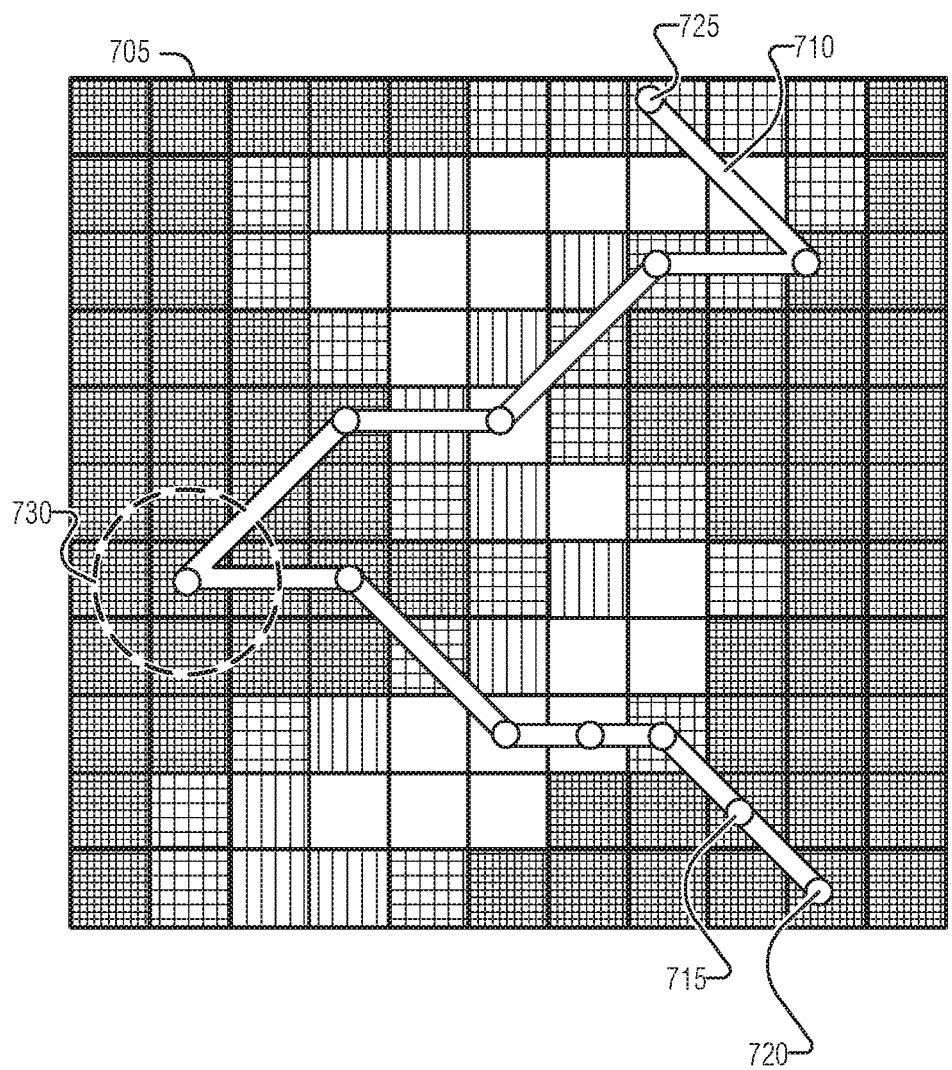
FIG. 7 illustrates an example of temporally encoding a static spatial image, according to an embodiment.
Figure 8:
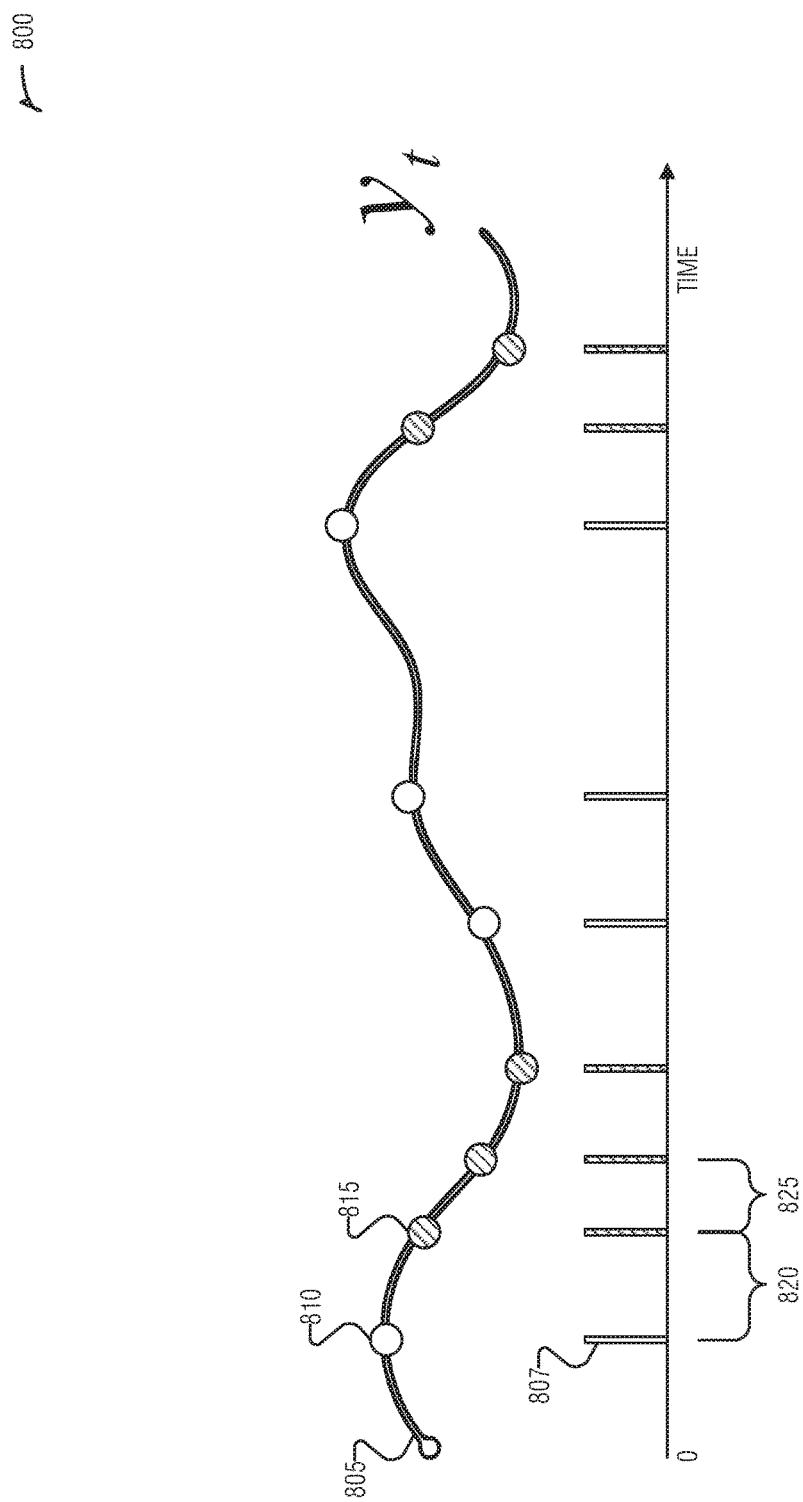
FIG. 8 illustrates an example of a result of temporally encoding a static spatial image, according to an embodiment.
Figure 9:
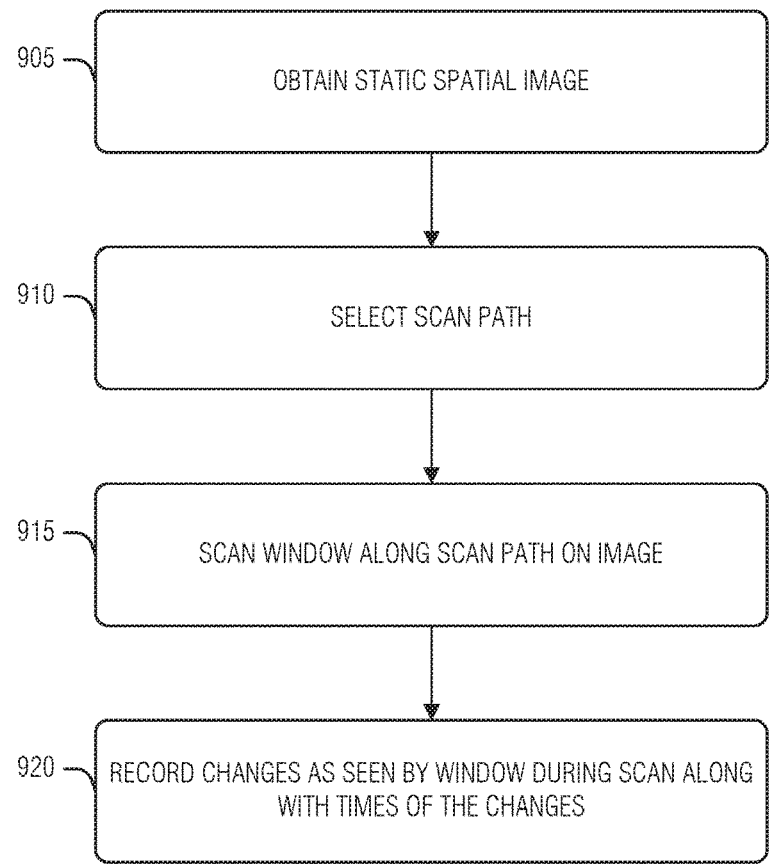
FIG. 9 illustrates an example of a method for temporally encoding a static spatial image, according to an embodiment.

FIG. 7 illustrates an example of temporally encoding a static spatial image 705, according to an embodiment. The unsupervised pattern recognition and affinity to neuromorphic hardware of SNNs provides a strong case for using these neural networks. However, as noted above, the application of SNNs to static spatial images may prove challenging unless those images are converted into a spiking-type input. FIGS. 7-9 illustrate a spike compatible encoding for static spatial images, in which the static spatial image 705 is temporally encoded.

As illustrated, the static spatial image 705 is a grid of pixels with small hatching indicating a darker luminance, large hatching a darker intermediary luminance, vertical stripes indicating a lighter intermediary luminance, and white indicating a lighter luminance. These four levels of luminance are used for the sake of simplicity in explanation, however, any degree of luminance, or color, may be used. Further, in an example, voxels (e.g., three dimensional pixels) may be substituted.

To temporally encode the static spatial image 705, a scan path 710 is selected. The scan path 710 may be selected to cover the entire image 705, such that every pixel is covered by the path 710. In an example, the scan path 710 is selected based on a task. Example tasks may include recognizing a face, recognizing a roadway, or classifying an object. In these examples, the path 710 may not cover every pixel of the image 705, but rather traverse areas of the image likely to contain the desired object of classification. For example, if a roadway edge for a self-driving vehicle is sought, the scan path 710 may start in the center of the image 705 and zig-zag from bottom to top, assuming that the vehicle is currently on the roadway and that the camera delivering the image 705 is pointed forward.

A scan involves a scan window 730 traversing the scan path 710 over a time period, starting at point 720 and ending at point 725. The scan window 730 will cover one or more pixels of the image 705 at any point in time such that, as the scan progresses, the pixels of the image 705 covered change in time. Thus, definite portions of the window 730 change in time as the underlying pixels change. As illustrated, a portion of the window 730 may be defined as a coordinate of a pixel relative to the scan window 730. For example, nine pixels are illustrated as being currently covered (at least partially so), of the scan window 730, and may be indexed by row and column starting in the upper left and ending in the lower right, such as (0, 0), (0, 1), (0, 2), (1, 0), (1, 1), (1, 2), (2, 0), (2, 1), (2, 2). Thus, as the scan window 730 moved from way point 715 to its current position, the portion of the scan window 730 at coordinate (0, 0) changes from a darker intermediary luminance to a darker luminance. In an example, the scan window 730 may be any geometric shape appropriate to the dimensionality of the image 705, such as a square in a two dimensional image and a cube in a three dimensional image. In an example, the window 730 is a single pixel or voxel.

The scan path 710 may also define a timing to be used in the scan. In an example, the timing is linear, such that the scan progresses from one pixel to the next with a time between pixels equal to the number of pixels divided by the scan duration. In an example, the timing is not linear. In this example, the scan may proceed briskly during some segments of the scan and more slowly in others. This is here illustrated by the waypoints on the path 710 starting with way point 715 and progressing pixel-by-pixel at first and then accelerating to cover two pixels at each step. This progression may be helpful, for example, in covering areas in which interesting features are not expected more quickly, such as the center of the roadway, or the bottom of pictures where feet are expected rather than faces when face recognition is desired. In an example, each pixel is randomly assigned a fixed time t to be visited as part of the scan path during the scan duration.

As the scan progresses, the changes in the portion of the window 730 are recorded along with the time the change was observed. In an example, the change is a measurement of the value of the portion (e.g., a luminance, color, etc. of the underlying pixel). In an example, the change is relative to a previous value for the portion. This last example may be thought of as responding only to dynamic changes in the image 705, being highly efficient in unchanging portions by avoiding the recording of unchanging portions of the window 730. In an example, the recordation occurs via a spike to a SNN. Spiking saves the effort of recording the time a given change was encountered and also provides a ready input to SNN classifiers.

FIG. 8 illustrates an example of a result 800 of temporally encoding a static spatial image, according to an embodiment. The result 800 includes spikes indicating an intensity change (e.g., luminance change) of a predetermined step size as encountered during a scan. This produces an intensity profile 805 along the scan path, $y_t$ where $|y_t - y_0| > \in$. Spikes are illustrated along the time-line and mirrored on the intensity profile 805, with the white rectangles and circles respectively indicating a positive step in intensity and the shaded rectangles and circles indicating a negative step in intensity. Thus spike 807 and 810 represent the same spike and indicate a positive change in intensity at that time while the spike 815 indicates a negative step in intensity.

The time periods 820 and 825 illustrate that the time between spikes varies as the intensity changes are encountered during the scan. This is the nature of the temporal encoding, where the scan path and the timing between waypoints on the scan path provide a structure to encounter pixels of the static spatial image while changes encountered are recorded (e.g., with a timestamp or as a spike). To extend this recordation to multiple colors, for example, separate intensity paths may correspond to each color being recorded.

The extension to multiple dimensions (e.g., voxels) does not involve a difference in the intensity profile 805, but rather simply a difference in the scan path to traverse the additional dimensions. This principle may, for example, be extended to non-visual data, such as word vectors used in semantic document classification.

FIG. 9 illustrates an example of a method 900 for temporally encoding a static spatial image, according to an embodiment. The operations of the method 900 are implemented in electronic hardware, such as that described below with respect to FIG. 13 (e.g., circuits).

At operation 905, a static spatial image is obtained (e.g., retrieved or received). As noted above, the static spatial image defines pixel values over an area. Static spatial images may include still photographs, frames from video, etc. In an example, the static spatial image is an unchanging data set of one or more dimensions.

At operation 910, a scan path is selected. As noted above, the scan path defines a path across the area of the static spatial image. In an example, the scan path includes a duration path. Here, the duration path defines the progress of the scan path in time. This is called a duration path because the individual step along the path per unit time may vary, and thus the duration varies with the path. In an example, the duration path defines a fixed time period over which the scan path occurs. In an example, the duration path is a function. In an example, the function is an accelerating function (e.g., exponential) such that it starts slow and increases over time, or deaccelerating function (e.g., logarithmic) such that it starts fast and decreases over time. In an example, the function is linear (e.g., constant step size). In an example, each pixel of the static spatial image along the scan path is randomly assigned a fixed time to register a spike within the time period.

At operation 915, a window is scanned along the scan path on the static spatial image to produce changes in a portion of the window over time. In an example, the window is a single pixel and the portion of the window is the pixel. In an example, the window is a plurality of pixels and the portion is a single pixel of the plurality of pixels.

At operation 920, the changes in the portion of the window are recorded with respective times of the changes. In an example, recording the changes includes producing a spike at the respective times. In an example, the spike encodes the changes as a difference from a last state of the portion of the window.

The method 900 may be extended to learn patterns in the temporally encoded static spatial image. Simple (e.g., non-multi-part) patterns may be learned via the STDP techniques discussed above (e.g., with respect to FIGS. 1-6D). More complex (e.g., multi-part) patterns may be learned via the multi-part pattern detection discussed below with respect to FIGS. 10 and 11.

The identification of an early part of a simple pattern may be achieved via a simple network of input neurons connected to an output neuron of an SNN and STDP learning. The case becomes more complex, however, for multi-part patterns. Multi-part patterns include a collection of simple patterns or different parts of the same pattern in time. For example, if a gesture involves the positioning of a fist with extended thumb held horizontal to the ground first, and the proceeds to pose the thumb perpendicular to, and pointing away from, the ground (e.g., a "thumbs up"), and a second gesture differs in having an opposite orientation of the thumb in the second position (e.g., a "thumbs down"), the early pattern identification of the simple SNN is likely to key off of the sideways thumb because it occurs at least as often, and likely more often, than the two ending positions. The network illustrated in FIG. 10 addresses this issue while maintaining the power of SNNs and STDP.

Figure 10:
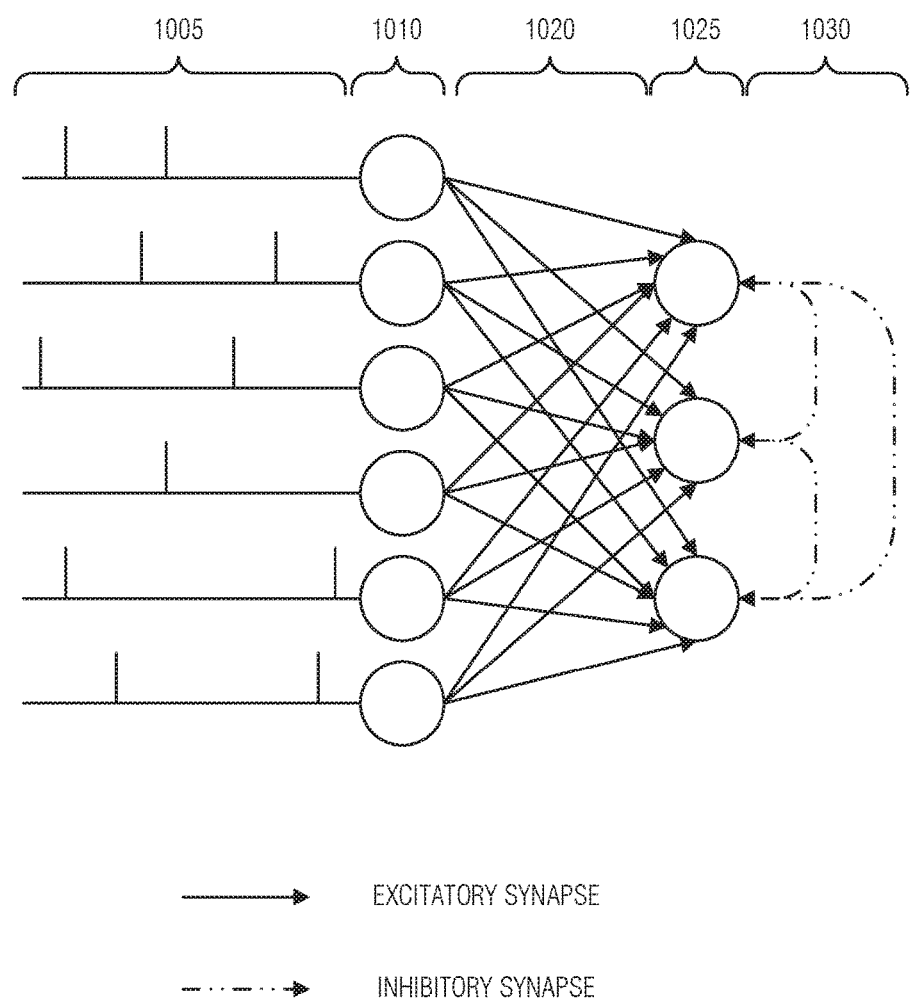
FIG. 10 illustrates an example of a SNN to implement multi-part pattern detection, according to an embodiment.

FIG. 10 illustrates an example of a SNN to implement multi-part pattern detection in an SNN, according to an embodiment. The SNN includes input spike trains 1005 and input neurons 1010, much like those described above with respect to FIG. 5. Here, however, the SNN includes an output neuron 1025 for each part of the multi-part pattern. Thus, as illustrated, this SNN may identify three parts of the pattern. The output neurons 1025 are connected by the synapses 1020 to the input neurons 1010 and operate as in an SNN (e.g., they are excitatory performing additive STDP).

Unlike the SNNs described above, however, the output neurons 1025 are also connected to each other via recurrent inhibitory, and in an example fixed, synapses 1030. By the operations of these inhibitory synapses 1030, when an output neuron 1025 spikes, it will suppress the spiking behavior of the other output neurons 1025. Thus, whichever output neuron converges most quickly upon a given pattern will claim responsibility for that pattern (e.g., winner takes all) as the other output neurons 1025, without spiking, will fail to reinforce the synapses 1020 contributing to the claimed pattern as illustrated above in FIGS. 6A-6D.

The inhibitory effect may include a prohibition on spiking. Thus, upon receipt of the inhibitory spike, the recipient node simply does not spike even if the inputs are sufficient to cause a spike. In an example, the inhibitory effect is a reverse application of the weight applied to a standard synapse 1020. For example, the inhibitory synapse 1030 includes a weight, but rather than adding to the effect of the traditional synapse 1020, it subtracts. This technique may address some race conditions between two output neurons otherwise converging on the same part of the pattern at the same time.

The above technique will identify multiple unrelated patterns because each output neuron 1025 converges on different ones of those patterns. If two output neurons 1025 start converging on the same pattern, it is likely (assuming random initialization of synapse weights) that one will converge earlier and thus suppress the ability of the second to converge on the same pattern. Being unable to converge on its initial pattern, this second output neuron 1025 will proceed to strengthen synapses 1020 for a second pattern. This principle operates the same for differences in time or space (e.g., input neurons 1010). Thus, the multi-part pattern may be simultaneous unrelated patterns, patterns of action that are related but separated in time (e.g., the thumb gesture example above) or related patterns separated in space. Each of these examples is a multi-part pattern as used herein.

Figure 11:
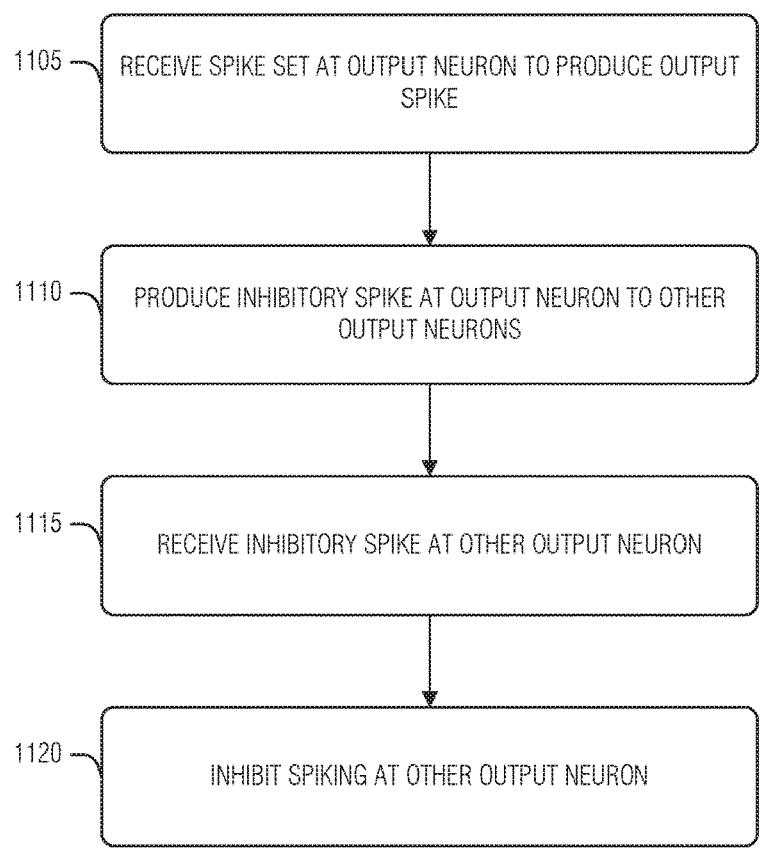
FIG. 11 illustrates an example of a method for multi-part pattern detection in an SNN, according to an embodiment.

FIG. 11 illustrates an example of a method 1100 for multi-part pattern detection in an SNN, according to an embodiment. The operations of the method 1100 are implemented in electronic hardware, such as that described below with respect to FIG. 13 (e.g., circuits).

At operation 1105, a spike set is received at an output neuron of the SNN. Here, the spike set meets a threshold to produce an output spike at the output neuron.

At operation 1110, an inhibitory spike is produced at the output neuron in response to the spike set meeting the threshold. The inhibitory spike is directed to a set of output neurons. In an example, the set of output neurons includes all output neurons of the SNN that are not the neuron (e.g., every other output neuron). In an example, the inhibitory spike is like any other spike except that the destination synapse of the spike message is an inhibitory synapse. In an example, producing the inhibitory spike includes producing a spike addressed to an inhibitory synapse of each member of the set of output neurons. In an example, the inhibitory spike indicates its inhibitory nature in the spike message.

At operation 1115, the inhibitory spike is received at a member of the set of output neurons.

At operation 1120, spiking of the member output neuron is inhibited in response to receipt of the inhibitory spike. In an example, inhibiting spiking of the member includes preventing a spike from the member within a time period following receipt of the inhibitory spike. In an example, inhibiting spiking of the member includes reducing a spiking potential of the member based on the inhibitory spike and a weight of a synapse receiving the inhibitory spike.

In an example, the SNN implements STDP to govern unsupervised learning in the SNN. In an example, the SNN includes an input neuron set communicatively coupled to an output neuron set. In this example, each neuron of the output neuron set corresponds to a part of the multi-part pattern. In an example, parts of the multi-part pattern are unrelated single-part patterns. In an example, parts of the multi-part pattern are related divisions of the pattern in time.

FIG. 12 is an illustrative block diagram of an example of a neuromorphic core 1200 upon which one or more embodiments may be implemented. FIG. 12 also illustrates certain details of a life cycle of one neuron's spike as it propagates through the network 1205, dendrite 1210, and soma 1230, according to an example. Communication and computation in the neuromorphic architecture occurs in an event driven manner in response to spike events as they are generated and propagated throughout the neuromorphic network. Note that the soma and dendrite components shown in FIG. 12, in general will belong to different physical cores.

Although the spikes in FIG. 12 are illustrated as analog voltages spikes, in an actual hardware neuromorphic architecture implementation, spikes are represented digitally in different forms at different points in the pipeline. For example, when traversing the neuromorphic network, the spikes may be encoded as short data packets identifying a destination core and Axon ID.

Each stage in the spike data flow is described below:

SOMA_CFG 1232A and SOMA_STATE 1232B: A soma 1230 spikes in response to accumulated activation value upon the occurrence of an update operation at time T. Each neuron in a core 1200 has, at minimum, one entry in each of the soma CFG memory 1232A and the soma STATE memory 1232B. On each synchronization time step T, the configuration parameters for each neuron are read from SOMA_CFG 1232A in order to receive the incoming weighted neurotransmitter amounts received from dendrites corresponding to the neuron, and to update soma state values accordingly. More particularly, each neuron's present activation state level, also referred to as its Vm membrane potential state, is read from SOMA_STATE 1232B, updated based upon a corresponding accumulated dendrite value, and written back. In some embodiments, the accumulated dendrite value may be added to the stored present activation state value to produce the updated activation state level. In other embodiments, the function for integrating the accumulated dendrite value may be more complex and may involve additional state variables stored in SOMA_STATE. The updated Vm value may be compared to a threshold activation level value stored in SOMA_CFG 1232A and, if Vm exceeds the threshold activation level value in an upward direction, then the soma produces an outgoing spike event. The outgoing spike event is passed to the next AXON_MAP 1234 stage, at time $T+D_{axon}$, where $D_{axon}$ is a delay associated with the neuron's axon, which also is specified by SOMA_CFG 1232A. At this point in the core's pipeline, the spike may be identified only by the core's neuron number that produced the spike. If the updated Vm value exceeds the threshold, then the stored activation level may be reset to an activation level of zero. If the updated Vm value does not exceed the threshold, then the updated Vm value may be stored in the SOMA_STATE memory 1232B for use during a subsequent synchronization time step.

AXON_MAP 1234: The spiking neuron index is mapped through the AXON_MAP memory table 1234 to provide a (base_address, length) pair identifying a list of spike fanout destinations in the next table in the pipeline, the AXON_CFG 1236 routing table. AXON_MAP 1234 provides a level of indirection between the soma compartment index and the AXON_CFG 1236 destination routing table. This allows AXON_CFG's 1236 memory resources to be shared across all neurons implemented by the core in a flexible, non-uniform manner. In an alternate embodiment, the AXON_MAP 1234 state is integrated into the SOMA_CFG 1232A memory. However, splitting this information into a separate table saves power since the AXON_MAP 1234 information is only needed when a neuron spikes, which is a relatively infrequent event.

AXON_CFG 1236: Given the spike's base address and fanout list length from AXON_MAP 1234, a list of (dest_core, axon_id) pairs is serially read from the AXON_CFG 1236 table. Each of these becomes an outgoing spike message to the network 1205, sent serially one after the other. Since each list is mapped uniquely per neuron index, some neurons may map to a large number of destinations (i.e., a multicast distribution), while others may only map to a single destination (unicast). List lengths may be arbitrarily configured as long as the total entries does not exceed the total size of the AXON_CFG 1236 memory.

NETWORK 1205: The network 1205 routes each spike message to a destination core in a stateless, asynchronous manner. From the standpoint of the computational model, the routing happens in zero time, i.e., if the spike message is generated at time T, then it is received at the destination core at time T relative to the source core's time step. (Note: due to possible barrier synchronization non-determinism, if so configured, the destination core may receive the message at a time step $T \pm \Delta D_{BS}$, where $\Delta D_{BS}$ is the maximum barrier synchronization delay of the system.) The AxonID spike packet payload is an opaque identifier interpreted uniquely by the destination core and has no meaning to the network.

SYNAPSE_MAP 1212: As each spike message is received by its destination core, the AxonID identifier from the spike message's payload is mapped through the SYNAPSE_MAP 1212 table to give a (base_address, length) pair that corresponds to one or more dendrites of the neuron identified in the spike message. This lookup is directly analogous to the AXON_MAP 1234 table lookup. The mapping assigns a list of local synapses that specify connections to dendrite compartments within the core. Note that each AxonID mapped by the source core's AXON_CFG 1236 entry is meaningful only to the destination core, so there are no global allocation constraints on the AxonID space. In an alternative embodiment, similar to AXON_MAP 1234, the (base_address, length) information mapped by SYNAPSE_MAP 1212 is specified directly from AXON_CFG 1236 and sent as the spike payload, instead of AxonID. However, the use of the SYNAPSE_MAP 1212 indirection allows the AXON_CFG memory 1236 and the spike payload to be smaller, thereby saving overall area and power for large systems.

SYNAPSE_CFG 1214: Similar to AXON_CFG 1236, SYNAPSE_CFG 1214 is a memory of variable-length routing lists that are shared among all of the core's dendritic compartments. However, unlike AXON_CFG 1236, each entry in SYNAPSE_CFG 1214 has a highly configurable format. Depending on the needs of the particular neuromorphic algorithm used, formats may be specified that provide more or less information per synapse, such as higher weight and delay precision. SYNAPSE_CFG 1214 is a direct-mapped table, with each mapped entry having a fixed bit width, so higher precision fields imply fewer synapses per entry, and lower precisions enable more synapses per entry. In general each SYNAPSE_CFG 1214 entry is uniquely decoded to produce a set of synaptic connections, with each synaptic connection being a (DendriteIdx, Weight, Delay) three-tuple. Hence a list of m SYNAPSE_CFG 1214 entries as specified by the SYNAPSE_MAP 1212 entry will become a set of $(\Sigma_{i=1}^{m} n_i)$ synaptic connections, where $n_i$ is the number of synapses in the ith SYNAPSE_CFG 1214 entry in the list.

DENDRITE_ACCUM 1216: Finally, each spike's synaptic connections map to counters within the dendrite compartment that maintain the sum of all weighted spikes received for future handling by soma. DENDRITE_ACCUM 1216 is a two-dimensional read-modify-write memory indexed by (DendriteIdx, (T+Delay) % $D_{MAX}$). As described earlier, the T+Delay term identifies the future time step at which the soma will receive the spike. The % $D_{MAX}$ modulo operation implements a circular scheduler buffer. The read-modify-write operation simply linearly accumulates the received synaptic weight: DENDRITE_ACCUM[idx, (T+D) % $D_{MAX}$]=DENDRITE_ACCUM[idx, (T+D) % $D_{MAX}$]+W.

As described above, at each time step T, the soma 1230 receives an accumulation of the total spike weight received (WeightSum) via synapses mapped to specific dendritic compartments. In the simplest embodiment, each dendritic compartment maps to a single neuron soma. Such an embodiment implements a single-compartment point neuron model, consistent with nearly all previous neuromorphic frameworks and hardware designs published to date. An extension of this architecture disclosed in a separate patent application provides support for multi-compartment neuron models.

The SOMA_CFG 1232A and SOMA_STATE 1232B memories serve as the basic architectural ingredients from which a large space of spiking neural network models may be implemented. Simpler models may minimize the size of these memories by modeling synaptic input responses with single-timestep current impulses, low state variable resolution with linear decay, and zero-time axon delays. More complex neuron models may implement higher resolution state variables with exponential decay, multiple resting potentials per ion channel type, additional neuron state variables for richer spiking dynamics, dynamic thresholds implementing homeostasis effects, and multiple output spike timer state for accurate burst modeling and large axonal delays. These variations in neuron model features represent choices over a spectrum of functionality localized to the soma stage in the architecture. Greater neuroscience detail costs higher SOMA_CFG 1232A and SOMA_STATE 1232B resources and greater logic area and power, while cruder neuroscience models require less resources and lower power. The neuromorphic architecture herein supports a very wide spectrum of such choices.

The soma configuration in some embodiments implements a simple current-based Leaky Integrate-and-Fire (LIF) neuron model. The subthreshold dynamics of the LIF neuron model are described by the following discrete-time dimensionless difference equations:

$$u[t] = \left(1 - \frac{1}{\tau_s}\right)u[t-1] + \sum_{i \in l} w_i s_i[t]$$

$$v[t] = \left(1 - \frac{1}{\tau_m}\right)v[t-1] + u[t] + b$$

where:

$\tau_s$ and $\tau_m$ are synaptic and membrane time constants, respectively;

l is the set of fanin synapses for the neuron;

$w_i$ is the weight of synapse i;

$s_i[t]$ is the count of spikes received for time step t at synapse i, after accounting for synaptic delays; and b is a constant bias current.

For computational efficiency, the exponential scalings are configured and scaled according to the following fixed-point approximation:

$$\left(1 - \frac{1}{\tau}\right) \approx \frac{4096 - D}{4096}$$

where the D decay constants ($D_s$ and $D_m$) can range over [0,4096], corresponding to $\tau$ time constants nonlinearly spaced over the range [1,∞].

When the membrane voltage v[t] passes some fixed threshold θ from below, the neuron schedules an output spike for t+$T_{axon}$ based on a constant configured axon delay ($T_{axon} \in [0,15]$), and v[t] is mapped to 0. The membrane potential is held at 0 until t+$T_{ref}$, where $T_{ref}$ is the refractory delay, which may be specified as a constant in SOMA_CFG 1232A or configured to be pseudorandomly generated.

Due to the high connectivity fanouts in neuromorphic architectures, the state associated with synaptic connections dominates the physical cost of hardware realizations of spiking neural networks. Mammalian neurons commonly have on the order of 10,000 synapses. A synapse generally can be reasonably modeled with a small number of bits, on the order of eight to fifty less state and configuration needed for the LIF soma state. Thus in a biologically faithful hardware implementation with 10,000 synapses per neuron, where all of these parameters are either uniquely programmable or dynamic, synaptic state dominates by a factor of well over 200.

Furthermore, depending on the SNN algorithmic application used by the neuromorphic network, the range of fanouts per neuron and the range of synaptic state may vary considerably. For example, some pattern matching algorithms call for only a single bit of weight precision per synapse, whereas others require real-valued connectivity weights encoded with up to eight bits per synapse. Other algorithmic features such as temporal coding, polychronous computation, and dynamic learning can add considerably more state per synapse. The synaptic connectivity of some algorithms have simple all-to-all connectivity between the neurons which can be simply specified in dense matrix form. Many other algorithms assume sparse connectivity between neurons, or by some dynamic pruning process converge to a sparse network that cannot be represented efficiently with dense matrices. All told, the amount of desired state per synapse can span over a range of 10× and higher, depending on the application need.

The neuromorphic architecture described herein advantageously supports a broad range of such synaptic connectivity models. The neuromorphic architecture described herein leaves it up to software to program the desired level of synaptic precision and mapping flexibility, subject to total memory size constraints.

The capability to support a wide range of synaptic connectivity models arises from the following ingredients:

The SYNAPSE_MAP/SYNAPSE_CFG 1212/1214 and AXON_MAP/AXON_CFG 1234/1236 pairs of mapping tables on each core's ingress and egress sides, respectively. Each pair's MAP table provides the indirection needed to allocate variable-length connectivity lists anywhere in the subsequent CFG memory. This allows the CFG memory entries to be shared among the neural resources contained within the core.

Each memory address of SYNAPSE_CFG 1214 maps to an entry whose format is explicitly specified by the entry itself. For example, in some neuromorphic network embodiments, only bits 2:0 have a fixed interpretation over all SYNAPSE_CFG 1214 entries. This field specifies one of eight formats over the rest of the bits in the entry. Depending on the entry type, different precisions of synaptic parameters are encoded. Entry formats with lower precision parameters support more synapses, while higher precision parameters may be specified if desired at the expense of fewer synapses in the entry.

Similarly, the entries in the AXON_CFG 1236 memory may likewise encode different spike message types. This allows spikes traveling shorter distances from the source core to consume less resources since the information required to identify a destination core increases with its distance. In particular, spikes destined to cores physically located on different integrated circuit chips may require a hierarchical address, with the higher-level hierarchical portion of the address stored in an additional AXON_CFG 1236 entries.

Since the space of useful encoding formats may exceed the number of formats any particular core typically needs, further indirection in the format determination provides additional flexibility with lower hardware cost. The TYPE field (bits 2:0) described above may index a global SYNAPSE_CFG_FORMAT table that parametrically maps the three-bit field to a richer encoding format specified by many more bits.

In order to normalize different ranges of parameter values across the variable precisions of different SYNAPSE_CFG 1214 entries, each format has a further programmable indirection table associated with it. For example, if the native DENDRITE_ACCUM 1216 input bit width is 8 bits, then a 1-bit synaptic weight W from a SYNAPSE_CFG 1214 entry may be mapped through a two-entry, 8b-valued table to give the full-precision values associated with the '0' and '1' programmed W values.

Figure 13:
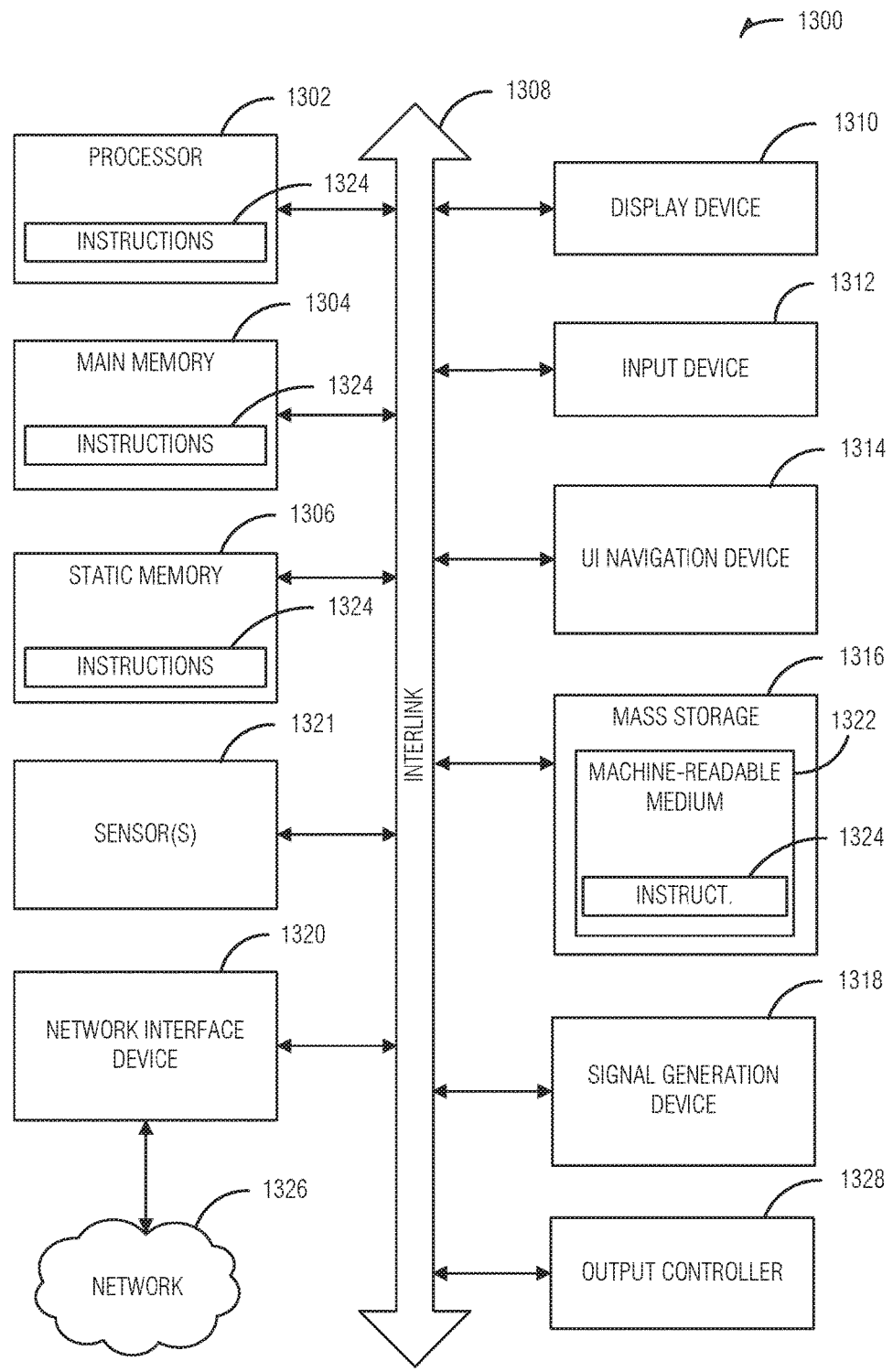
FIG. 13 is a block diagram illustrating an example of a machine upon which one or more embodiments may be implemented.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

Additional Notes & Examples

Example 1 is a system for temporally encoding static spatial images, the system comprising: electronic circuitry;

and a memory including instructions that, when executed by the electronic circuitry, cause the electronic circuitry to: obtain a static spatial image, the static spatial image defining pixel values over an area; select a scan path, the scan path defining a path across the area of the static spatial image; scan a window along the scan path on the static spatial image to produce changes in a portion of the window over time; and record the changes in the portion of the window with respective times of the changes.

In Example 2, the subject matter of Example 1 optionally includes wherein the window is a single pixel and the portion of the window is the single pixel.

In Example 3, the subject matter of any one or more of Examples 1-2 optionally include wherein the window is a plurality of pixels and the portion is a single pixel of the plurality of pixels.

In Example 4, the subject matter of any one or more of Examples 1-3 optionally include wherein to record the changes in the portion of the window with respective times of the changes includes the electronic circuitry to produce a spike at the respective times.

In Example 5, the subject matter of Example 4 optionally includes wherein the spike encodes the changes as a difference from a last state of the portion of the window.

In Example 6, the subject matter of any one or more of Examples 4-5 optionally include wherein the instructions cause the electronic circuitry to: communicate the spikes to a spiking neural network (SNN) for pattern detection; and return a pattern detection output from the SNN in response to communicating the spikes.

In Example 7, the subject matter of Example 6 optionally includes wherein the pattern detection is a multi-part pattern detection.

In Example 8, the subject matter of Example 7 optionally includes wherein the instructions cause the electronic circuitry to: receive the spikes as a spike set at an output neuron of the SNN, the spike set meeting a threshold to produce an output spike at the output neuron; produce an inhibitory spike at the output neuron in response to the spike set meeting the threshold, the inhibitory spike directed to a set of other output neurons; receive the inhibitory spike at a member of the set of other output neurons; and inhibit spiking of the member in response to receipt of the inhibitory spike.

In Example 9, the subject matter of Example 8 optionally includes wherein the set of other output neurons includes all output neurons of the SNN that are not the output neuron.

In Example 10, the subject matter of any one or more of Examples 8-9 optionally include wherein to produce the inhibitory spike includes the electronic circuitry to produce a spike addressed to an inhibitory synapse of each member of the set of other output neurons.

In Example 11, the subject matter of any one or more of Examples 8-10 optionally include wherein inhibiting spiking of the member includes preventing a spike from the member within a time period following receipt of the inhibitory spike.

In Example 12, the subject matter of any one or more of Examples 8-11 optionally include wherein to inhibit spiking of the member includes the electronic circuitry to reduce a spiking potential of the member based on the inhibitory spike and a weight of a synapse receiving the inhibitory spike.

In Example 13, the subject matter of any one or more of Examples 8-12 optionally include wherein the SNN implements spike timing dependent plasticity (STDP), and wherein STDP operates to govern unsupervised learning in the SNN.

In Example 14, the subject matter of any one or more of Examples 8-13 optionally include wherein the SNN includes an input neuron set communicatively coupled to an output neuron set, each neuron of the output neuron set corresponding to a part of the multi-part pattern.

In Example 15, the subject matter of Example 14 optionally includes wherein parts of the multi-part pattern are unrelated single-part patterns.

In Example 16, the subject matter of any one or more of Examples 14-15 optionally include wherein parts of the multi-part pattern are related divisions of the pattern in time.

In Example 17, the subject matter of any one or more of Examples 1-16 optionally include wherein the scan path includes a duration path, the duration path defining the progress of the scan path in time.

In Example 18, the subject matter of Example 17 optionally includes wherein the duration path defines a fixed time period over which the scan path occurs.

In Example 19, the subject matter of any one or more of Examples 17-18 optionally include wherein the duration path is a function.

In Example 20, the subject matter of Example 19 optionally includes wherein the function is linear.

In Example 21, the subject matter of Example 20 optionally includes wherein each pixel of the static spatial image along the scan path is randomly assigned a fixed time to register a spike within a time period.

Example 22 is a method for temporally encoding static spatial images, the method comprising: obtaining a static spatial image, the static spatial image defining pixel values over an area; selecting a scan path, the scan path defining a path across the area of the static spatial image; scanning a window along the scan path on the static spatial image to produce changes in a portion of the window over time; and recording the changes in the portion of the window with respective times of the changes.

In Example 23, the subject matter of Example 22 optionally includes wherein the window is a single pixel and the portion of the window is the single pixel.

In Example 24, the subject matter of any one or more of Examples 22-23 optionally include wherein the window is a plurality of pixels and the portion is a single pixel of the plurality of pixels.

In Example 25, the subject matter of any one or more of Examples 22-24 optionally include wherein recording the changes in the portion of the window with respective times of the changes includes producing a spike at the respective times.

In Example 26, the subject matter of Example 25 optionally includes wherein the spike encodes the changes as a difference from a last state of the portion of the window.

In Example 27, the subject matter of any one or more of Examples 25-26 optionally include communicating the spikes to a spiking neural network (SNN) for pattern detection; and returning a pattern detection output from the SNN in response to communicating the spikes.

In Example 28, the subject matter of Example 27 optionally includes wherein the pattern detection is a multi-part pattern detection.

In Example 29, the subject matter of Example 28 optionally includes receiving the spikes as a spike set at an output neuron of the SNN, the spike set meeting a threshold to produce an output spike at the output neuron; producing an inhibitory spike at the output neuron in response to the spike set meeting the threshold, the inhibitory spike directed to a set of other output neurons; receiving the inhibitory spike at a member of the set of other output neurons; and inhibiting spiking of the member in response to receipt of the inhibitory spike.

In Example 30, the subject matter of Example 29 optionally includes wherein the set of other output neurons includes all output neurons of the SNN that are not the output neuron.

In Example 31, the subject matter of any one or more of Examples 29-30 optionally include wherein producing the inhibitory spike includes producing a spike addressed to an inhibitory synapse of each member of the set of other output neurons.

In Example 32, the subject matter of any one or more of Examples 29-31 optionally include wherein inhibiting spiking of the member includes preventing a spike from the member within a time period following receipt of the inhibitory spike.

In Example 33, the subject matter of any one or more of Examples 29-32 optionally include wherein inhibiting spiking of the member includes reducing a spiking potential of the member based on the inhibitory spike and a weight of a synapse receiving the inhibitory spike.

In Example 34, the subject matter of any one or more of Examples 29-33 optionally include wherein the SNN implements spike timing dependent plasticity (STDP), and wherein STDP operates to govern unsupervised learning in the SNN.

In Example 35, the subject matter of any one or more of Examples 29-34 optionally include wherein the SNN includes an input neuron set communicatively coupled to an output neuron set, each neuron of the output neuron set corresponding to a part of the multi-part pattern.

In Example 36, the subject matter of Example 35 optionally includes wherein parts of the multi-part pattern are unrelated single-part patterns.

In Example 37, the subject matter of any one or more of Examples 35-36 optionally include wherein parts of the multi-part pattern are related divisions of the pattern in time.

In Example 38, the subject matter of any one or more of Examples 22-37 optionally include wherein the scan path includes a duration path, the duration path defining the progress of the scan path in time.

In Example 39, the subject matter of Example 38 optionally includes wherein the duration path defines a fixed time period over which the scan path occurs.

In Example 40, the subject matter of any one or more of Examples 38-39 optionally include wherein the duration path is a function.

In Example 41, the subject matter of Example 40 optionally includes wherein the function is linear.

In Example 42, the subject matter of Example 41 optionally includes wherein each pixel of the static spatial image along the scan path is randomly assigned a fixed time to register a spike within a time period.

Example 43 is at least one machine readable medium including instructions that, when executed by a machine, cause the machine to perform any of methods 22-42.

Example 44 is a system including means to perform any of methods 22-42.

Example 45 is at least one machine readable medium including instructions for temporally encoding static spatial images, the instructions, when executed by a machine, cause the machine to perform operations comprising: obtaining a static spatial image, the static spatial image defining pixel values over an area; selecting a scan path, the scan path defining a path across the area of the static spatial image; scanning a window along the scan path on the static spatial image to produce changes in a portion of the window over time; and recording the changes in the portion of the window with respective times of the changes.

In Example 46, the subject matter of Example 45 optionally includes wherein the window is a single pixel and the portion of the window is the single pixel.

In Example 47, the subject matter of any one or more of Examples 45-46 optionally include wherein the window is a plurality of pixels and the portion is a single pixel of the plurality of pixels.

In Example 48, the subject matter of any one or more of Examples 45-47 optionally include wherein recording the changes in the portion of the window with respective times of the changes includes producing a spike at the respective times.

In Example 49, the subject matter of Example 48 optionally includes wherein the spike encodes the changes as a difference from a last state of the portion of the window.

In Example 50, the subject matter of any one or more of Examples 48-49 optionally include wherein the operations comprise: communicating the spikes to a spiking neural network (SNN) for pattern detection; and returning a pattern detection output from the SNN in response to communicating the spikes.

In Example 51, the subject matter of Example 50 optionally includes wherein the pattern detection is a multi-part pattern detection.

In Example 52, the subject matter of Example 51 optionally includes wherein the operations comprise: receiving the spikes as a spike set at an output neuron of the SNN, the spike set meeting a threshold to produce an output spike at the output neuron; producing an inhibitory spike at the output neuron in response to the spike set meeting the threshold, the inhibitory spike directed to a set of other output neurons; receiving the inhibitory spike at a member of the set of other output neurons; and inhibiting spiking of the member in response to receipt of the inhibitory spike.

In Example 53, the subject matter of Example 52 optionally includes wherein the set of other output neurons includes all output neurons of the SNN that are not the output neuron.

In Example 54, the subject matter of any one or more of Examples 52-53 optionally include wherein producing the inhibitory spike includes producing a spike addressed to an inhibitory synapse of each member of the set of other output neurons.

In Example 55, the subject matter of any one or more of Examples 52-54 optionally include wherein inhibiting spiking of the member includes preventing a spike from the member within a time period following receipt of the inhibitory spike.

In Example 56, the subject matter of any one or more of Examples 52-55 optionally include wherein inhibiting spiking of the member includes reducing a spiking potential of the member based on the inhibitory spike and a weight of a synapse receiving the inhibitory spike.

In Example 57, the subject matter of any one or more of Examples 52-56 optionally include wherein the SNN implements spike timing dependent plasticity (STDP), and wherein STDP operates to govern unsupervised learning in the SNN.

In Example 58, the subject matter of any one or more of Examples 52-57 optionally include wherein the SNN includes an input neuron set communicatively coupled to an output neuron set, each neuron of the output neuron set corresponding to a part of the multi-part pattern.

In Example 59, the subject matter of Example 58 optionally includes wherein parts of the multi-part pattern are unrelated single-part patterns.

In Example 60, the subject matter of any one or more of Examples 58-59 optionally include wherein parts of the multi-part pattern are related divisions of the pattern in time.

In Example 61, the subject matter of any one or more of Examples 45-60 optionally include wherein the scan path includes a duration path, the duration path defining the progress of the scan path in time.

In Example 62, the subject matter of Example 61 optionally includes wherein the duration path defines a fixed time period over which the scan path occurs.

In Example 63, the subject matter of any one or more of Examples 61-62 optionally include wherein the duration path is a function.

In Example 64, the subject matter of Example 63 optionally includes wherein the function is linear.

In Example 65, the subject matter of Example 64 optionally includes wherein each pixel of the static spatial image along the scan path is randomly assigned a fixed time to register a spike within a time period.

Example 66 is a system for temporally encoding static spatial images, the system comprising: means for obtaining a static spatial image, the static spatial image defining pixel values over an area; means for selecting a scan path, the scan path defining a path across the area of the static spatial image; means for scanning a window along the scan path on the static spatial image to produce changes in a portion of the window over time; and means for recording the changes in the portion of the window with respective times of the changes.

In Example 67, the subject matter of Example 66 optionally includes wherein the window is a single pixel and the portion of the window is the single pixel.

In Example 68, the subject matter of any one or more of Examples 66-67 optionally include wherein the window is a plurality of pixels and the portion is a single pixel of the plurality of pixels.

In Example 69, the subject matter of any one or more of Examples 66-68 optionally include wherein recording the changes in the portion of the window with respective times of the changes includes producing a spike at the respective times.

In Example 70, the subject matter of Example 69 optionally includes wherein the spike encodes the changes as a difference from a last state of the portion of the window.

In Example 71, the subject matter of any one or more of Examples 69-70 optionally include means for communicating the spikes to a spiking neural network (SNN) for pattern detection; and means for returning a pattern detection output from the SNN in response to communicating the spikes.

In Example 72, the subject matter of Example 71 optionally includes wherein the pattern detection is a multi-part pattern detection.

In Example 73, the subject matter of Example 72 optionally includes means for receiving the spikes as a spike set at an output neuron of the SNN, the spike set meeting a threshold to produce an output spike at the output neuron; means for producing an inhibitory spike at the output neuron in response to the spike set meeting the threshold, the inhibitory spike directed to a set of other output neurons; means for receiving the inhibitory spike at a member of the set of other output neurons; and means for inhibiting spiking of the member in response to receipt of the inhibitory spike.

In Example 74, the subject matter of Example 73 optionally includes wherein the set of other output neurons includes all output neurons of the SNN that are not the output neuron.

In Example 75, the subject matter of any one or more of Examples 73-74 optionally include wherein producing the inhibitory spike includes producing a spike addressed to an inhibitory synapse of each member of the set of other output neurons.

In Example 76, the subject matter of any one or more of Examples 73-75 optionally include wherein inhibiting spiking of the member includes preventing a spike from the member within a time period following receipt of the inhibitory spike.

In Example 77, the subject matter of any one or more of Examples 73-76 optionally include wherein inhibiting spiking of the member includes reducing a spiking potential of the member based on the inhibitory spike and a weight of a synapse receiving the inhibitory spike.

In Example 78, the subject matter of any one or more of Examples 73-77 optionally include wherein the SNN implements spike timing dependent plasticity (STDP), and wherein STDP operates to govern unsupervised learning in the SNN.

In Example 79, the subject matter of any one or more of Examples 73-78 optionally include wherein the SNN includes an input neuron set communicatively coupled to an output neuron set, each neuron of the output neuron set corresponding to a part of the multi-part pattern.

In Example 80, the subject matter of Example 79 optionally includes wherein parts of the multi-part pattern are unrelated single-part patterns.

In Example 81, the subject matter of any one or more of Examples 79-80 optionally include wherein parts of the multi-part pattern are related divisions of the pattern in time.

In Example 82, the subject matter of any one or more of Examples 66-81 optionally include wherein the scan path includes a duration path, the duration path defining the progress of the scan path in time.

In Example 83, the subject matter of Example 82 optionally includes wherein the duration path defines a fixed time period over which the scan path occurs.

In Example 84, the subject matter of any one or more of Examples 82-83 optionally include wherein the duration path is a function.

In Example 85, the subject matter of Example 84 optionally includes wherein the function is linear.

In Example 86, the subject matter of Example 85 optionally includes wherein each pixel of the static spatial image along the scan path is randomly assigned a fixed time to register a spike within a time period.

Example 87 is a system for multi-part pattern detection in spiking neural network (SNN), the system comprising: electronic circuitry; and a memory including instructions that, when executed by the electronic circuitry, cause the electronic circuitry to: receive a spike set at an output neuron of the SNN, the spike set meeting a threshold to produce an output spike at the output neuron; produce an inhibitory spike at the output neuron in response to the spike set meeting the threshold, the inhibitory spike directed to a set of other output neurons; receive the inhibitory spike at a member of the set of other output neurons; and inhibit spiking of the member in response to receipt of the inhibitory spike.

In Example 88, the subject matter of Example 87 optionally includes wherein the set of other output neurons includes all output neurons of the SNN that are not the neuron.

In Example 89, the subject matter of any one or more of Examples 87-88 optionally include wherein to produce the inhibitory spike includes the electronic circuitry producing a spike addressed to an inhibitory synapse of each member of the set of other output neurons.

In Example 90, the subject matter of any one or more of Examples 87-89 optionally include wherein to inhibit spiking of the member includes the electronic circuitry preventing a spike from the member within a time period following receipt of the inhibitory spike.

In Example 91, the subject matter of any one or more of Examples 87-90 optionally include wherein inhibiting spiking of the member includes reducing a spiking potential of the member based on the inhibitory spike and a weight of a synapse receiving the inhibitory spike.

In Example 92, the subject matter of any one or more of Examples 87-91 optionally include wherein the SNN implements spike timing dependent plasticity (STDP), wherein STDP operates to govern unsupervised learning in the SNN.

In Example 93, the subject matter of any one or more of Examples 87-92 optionally include wherein the SNN includes an input neuron set communicatively coupled to an output neuron set, each neuron of the output neuron set corresponding to a part of the multi-part pattern.

In Example 94, the subject matter of Example 93 optionally includes wherein parts of the multi-part pattern are unrelated single-part patterns.

In Example 95, the subject matter of any one or more of Examples 93-94 optionally include wherein parts of the multi-part pattern are related divisions of the pattern in time.

Example 96 is a method for multi-part pattern detection in spiking neural network (SNN), the method comprising: receiving a spike set at an output neuron of the SNN, the spike set meeting a threshold to produce an output spike at the output neuron; producing an inhibitory spike at the output neuron in response to the spike set meeting the threshold, the inhibitory spike directed to a set of other output neurons; receiving the inhibitory spike at a member of the set of other output neurons; and inhibiting spiking of the member in response to receipt of the inhibitory spike.

In Example 97, the subject matter of Example 96 optionally includes wherein the set of other output neurons includes all output neurons of the SNN that are not the neuron.

In Example 98, the subject matter of any one or more of Examples 96-97 optionally include wherein producing the inhibitory spike includes producing a spike addressed to an inhibitory synapse of each member of the set of other output neurons.

In Example 99, the subject matter of any one or more of Examples 96-98 optionally include wherein inhibiting spiking of the member includes preventing a spike from the member within a time period following receipt of the inhibitory spike.

In Example 100, the subject matter of any one or more of Examples 96-99 optionally include wherein inhibiting spiking of the member includes reducing a spiking potential of the member based on the inhibitory spike and a weight of a synapse receiving the inhibitory spike.

In Example 101, the subject matter of any one or more of Examples 96-100 optionally include wherein the SNN implements spike timing dependent plasticity (STDP), wherein STDP operates to govern unsupervised learning in the SNN.

In Example 102, the subject matter of any one or more of Examples 96-101 optionally include wherein the SNN includes an input neuron set communicatively coupled to an output neuron set, each neuron of the output neuron set corresponding to a part of the multi-part pattern.

In Example 103, the subject matter of Example 102 optionally includes wherein parts of the multi-part pattern are unrelated single-part patterns.

In Example 104, the subject matter of any one or more of Examples 102-103 optionally include wherein parts of the multi-part pattern are related divisions of the pattern in time.

Example 105 is at least one machine readable medium including instructions that, when executed by a machine, cause the machine to perform any of methods 96-104.

Example 106 is a system including means to perform any of methods 96-104.

Example 107 is at least one machine readable medium including instructions for multi-part pattern detection in spiking neural network (SNN), the instructions, when executed by a machine, cause the machine to perform operations comprising: receiving a spike set at an output neuron of the SNN, the spike set meeting a threshold to produce an output spike at the output neuron; producing an inhibitory spike at the output neuron in response to the spike set meeting the threshold, the inhibitory spike directed to a set of other output neurons; receiving the inhibitory spike at a member of the set of other output neurons; and inhibiting spiking of the member in response to receipt of the inhibitory spike.

In Example 108, the subject matter of Example 107 optionally includes wherein the set of other output neurons includes all output neurons of the SNN that are not the neuron.

In Example 109, the subject matter of any one or more of Examples 107-108 optionally include wherein producing the inhibitory spike includes producing a spike addressed to an inhibitory synapse of each member of the set of other output neurons.

In Example 110, the subject matter of any one or more of Examples 107-109 optionally include wherein inhibiting spiking of the member includes preventing a spike from the member within a time period following receipt of the inhibitory spike.

In Example 111, the subject matter of any one or more of Examples 107-110 optionally include wherein inhibiting spiking of the member includes reducing a spiking potential of the member based on the inhibitory spike and a weight of a synapse receiving the inhibitory spike.

In Example 112, the subject matter of any one or more of Examples 107-111 optionally include wherein the SNN implements spike timing dependent plasticity (STDP), wherein STDP operates to govern unsupervised learning in the SNN.

In Example 113, the subject matter of any one or more of Examples 107-112 optionally include wherein the SNN includes an input neuron set communicatively coupled to an output neuron set, each neuron of the output neuron set corresponding to a part of the multi-part pattern.

In Example 114, the subject matter of Example 113 optionally includes wherein parts of the multi-part pattern are unrelated single-part patterns.

In Example 115, the subject matter of any one or more of Examples 113-114 optionally include wherein parts of the multi-part pattern are related divisions of the pattern in time.

Example 116 is a system for multi-part pattern detection in spiking neural network (SNN), the system comprising: means for receiving a spike set at an output neuron of the SNN, the spike set meeting a threshold to produce an output spike at the output neuron; means for producing an inhibitory spike at the output neuron in response to the spike set meeting the threshold, the inhibitory spike directed to a set of other output neurons; means for receiving the inhibitory spike at a member of the set of other output neurons; and means for inhibiting spiking of the member in response to receipt of the inhibitory spike.

In Example 117, the subject matter of Example 116 optionally includes wherein the set of other output neurons includes all output neurons of the SNN that are not the neuron.

In Example 118, the subject matter of any one or more of Examples 116-117 optionally include wherein producing the inhibitory spike includes producing a spike addressed to an inhibitory synapse of each member of the set of other output neurons.

In Example 119, the subject matter of any one or more of Examples 116-118 optionally include wherein inhibiting spiking of the member includes preventing a spike from the member within a time period following receipt of the inhibitory spike.

In Example 120, the subject matter of any one or more of Examples 116-119 optionally include wherein inhibiting spiking of the member includes reducing a spiking potential of the member based on the inhibitory spike and a weight of a synapse receiving the inhibitory spike.

In Example 121, the subject matter of any one or more of Examples 116-120 optionally include wherein the SNN implements spike timing dependent plasticity (STDP), wherein STDP operates to govern unsupervised learning in the SNN.

In Example 122, the subject matter of any one or more of Examples 116-121 optionally include wherein the SNN includes an input neuron set communicatively coupled to an output neuron set, each neuron of the output neuron set corresponding to a part of the multi-part pattern.

In Example 123, the subject matter of Example 122 optionally includes wherein parts of the multi-part pattern are unrelated single-part patterns.

In Example 124, the subject matter of any one or more of Examples 122-123 optionally include wherein parts of the multi-part pattern are related divisions of the pattern in time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for temporally encoding static spatial images, the system comprising:
    electronic circuitry; and
    a memory including instructions that, when executed by the electronic circuitry, cause the electronic circuitry to:
    obtain a static spatial image, the static spatial image defining pixel values over an area;
    select a scan path, the scan path defining:
        a path across the area of the static spatial image; and
        a duration path, the duration path being a non-linear function that defines progression of the scan path in time;
    scan a window in accordance with the scan path on the static spatial image to produce changes in a portion of the window over time; and
    record the changes in the portion of the window with respective times of the changes.

2. The system of claim 1, wherein the window is a single pixel and the portion of the window is the single pixel.

3. The system of claim 1, wherein to record the changes in the portion of the window with respective times of the changes includes the electronic circuitry to produce a spike at the respective times.

4. The system of claim 3, wherein the instructions cause the electronic circuitry to:

communicate the spikes to a spiking neural network (SNN) for pattern detection; and return a pattern detection output from the SNN in response to communicating the spikes.

5. The system of claim 4, wherein the pattern detection is a multi-part pattern detection.

6. The system of claim 5, wherein the instructions cause the electronic circuitry to:

receive the spikes as a spike set at an output neuron of the SNN, the spike set meeting a threshold to produce an output spike at the output neuron;

produce an inhibitory spike at the output neuron in response to the spike set meeting the threshold, the inhibitory spike directed to a set of other output neurons;

receive the inhibitory spike at a member of the set of other output neurons; and inhibit spiking of the member in response to receipt of the inhibitory spike.

7. The system of claim 3, wherein the spike encodes the changes as a difference from a last state of the portion of the window.

8. The system of claim 1, wherein each pixel of the static spatial image along the scan path is randomly assigned a fixed time to register a spike within a time period.

9. A method for temporally encoding static spatial images, the method comprising:

obtaining a static spatial image, the static spatial image defining pixel values over an area;

selecting a scan path, the scan path defining:
  a path across the area of the static spatial image; and
  a duration path, the duration path being a non-linear function that defines progression of the scan path in time;

scanning a window in accordance with the scan path on the static spatial image to produce changes in a portion of the window over time; and recording the changes in the portion of the window with respective times of the changes.

10. The method of claim 9, wherein the window is a single pixel and the portion of the window is the single pixel.

11. The method of claim 9, wherein recording the changes in the portion of the window with respective times of the changes includes producing a spike at the respective times.

12. The method of claim 11, comprising:

communicate the spikes to a spiking neural network (SNN) for pattern detection; and returning a pattern detection output from the SNN in response to communicating the spikes.

13. The method of claim 12, wherein the pattern detection is a multi-part pattern detection.

14. The method of claim 13, comprising:

receiving the spikes as a spike set at an output neuron of the SNN, the spike set meeting a threshold to produce an output spike at the output neuron;

producing an inhibitory spike at the output neuron in response to the spike set meeting the threshold, the inhibitory spike directed to a set of other output neurons;

receiving the inhibitory spike at a member of the set of other output neurons; and inhibiting spiking of the member in response to receipt of the inhibitory spike.

15. The method of claim 11, wherein the spike encodes the changes as a difference from a last state of the portion of the window.

16. The method of claim 9, wherein each pixel of the static spatial image along the scan path is randomly assigned a fixed time to register a spike within a time period.

17. At least one non-transitory machine readable medium including instructions for temporally encoding static spatial images, the instructions, when executed by a machine, cause the machine to perform operations comprising:

obtaining a static spatial image, the static spatial image defining pixel values over an area;

selecting a scan path, the scan path defining:
  a path across the area of the static spatial image; and
  a duration path, the duration path being a non-linear function that defines progression of the scan path in time;

scanning a window in accordance with the scan path on the static spatial image to produce changes in a portion of the window over time; and recording the changes in the portion of the window with respective times of the changes.

18. The at least one non-transitory machine readable medium of claim 17, wherein the window is a single pixel and the portion of the window is the single pixel.

19. The at least one non-transitory machine readable medium of claim 17, wherein recording the changes in the portion of the window with respective times of the changes includes producing a spike at the respective times.

20. The at least one non-transitory machine readable medium of claim 19, wherein the operations comprise:

communicating the spikes to a spiking neural network (SNN) for pattern detection; and returning a pattern detection output from the SNN in response to communicating the spikes.

21. The at least one non-transitory machine readable medium of claim 20, wherein the pattern detection is a multi-part pattern detection.

22. The at least one non-transitory machine readable medium of claim 21, wherein the operations comprise:

receiving the spikes as a spike set at an output neuron of the SNN, the spike set meeting a threshold to produce an output spike at the output neuron;

producing an inhibitory spike at the output neuron in response to the spike set meeting the threshold, the inhibitory spike directed to a set of other output neurons;

receiving the inhibitory spike at a member of the set of other output neurons; and inhibiting spiking of the member in response to receipt of the inhibitory spike.

23. The at least one non-transitory machine readable medium of claim 19, wherein the spike encodes the changes as a difference from a last state of the portion of the window.

24. The at least one non-transitory machine readable medium of claim 17, wherein each pixel of the static spatial image along the scan path is randomly assigned a fixed time to register a spike within a time period.

* * * * *